United States Patent [19]
Daly

[11] Patent Number: 6,141,184
[45] Date of Patent: Oct. 31, 2000

[54] TAPE DRIVE DATA STORAGE DEVICE HAVING PERPENDICULARLY ADJUSTED TAPE GUIDES

[75] Inventor: Keith L. Daly, Shrewsbury, Mass.

[73] Assignee: Quantum Corporation, Milpitas, Calif.

[21] Appl. No.: 09/066,101

[22] Filed: Apr. 23, 1998

[51] Int. Cl.[7] .................................................. G11B 15/60
[52] U.S. Cl. ...................................................... 360/130.21
[58] Field of Search ................................ 360/130.21, 85, 360/95

[56] References Cited

U.S. PATENT DOCUMENTS

| | | | |
|---|---|---|---|
| 4,709,288 | 11/1987 | Schaeffer et al. | 360/130.21 |
| 4,729,500 | 3/1988 | Gwon | 226/190 |
| 4,910,618 | 3/1990 | Yoshida | 360/85 |
| 4,970,614 | 11/1990 | Nakatsuka | 360/109 |
| 5,296,994 | 3/1994 | Katohno et al. | 360/130.21 |
| 5,407,117 | 4/1995 | Yokoo et al. | 226/190 |
| 5,430,922 | 7/1995 | Church et al. . | |
| 5,475,538 | 12/1995 | Nelson et al. | 360/16 |
| 5,561,572 | 10/1996 | Katsumata et al. | 360/130.2 |
| 5,870,924 | 2/1999 | Fahimi et al. | 72/379.2 |

*Primary Examiner*—David L. Ometz
*Assistant Examiner*—Angel Castro
*Attorney, Agent, or Firm*—Steven G. Roeder

[57] ABSTRACT

A magnetic tape drive data storage device includes a plurality of tape guides, wherein each of the plurality of tape guides is adjusted such that magnetic recording tape passes along tape travel surfaces of each of the plurality of tape guides in a desired perpendicular plane. Each of the plurality of tape guides includes a cylindrical shaft which is mounted to a head guide assembly (HGA), and a tape travel surface which co-axially rotates about the shaft as the magnetic recording tape passes along the tape travel surface. To orient the tape travel surface in a desired plane perpendicular to a perpendicularity datum, an adjustment component (e.g., a washer) is slipped over an upper stub portion of the shaft that extends above a flange of the HGA. Once the tape travel surface is oriented in the desired perpendicular plane, the adjustment component is secured to the flange to ensure that the tape travel surface remains in the desired perpendicular plane. Advantageously, this technique substantially improves the manufacturability of the tape drive and provides a tape drive with improved tape tracking performance.

23 Claims, 5 Drawing Sheets

TAPE DRIVE DATA STORAGE DEVICE HAVING PERPENDICULARLY ADJUSTED TAPE GUIDES

TECHNICAL FIELD

The present invention relates to magnetic recording assemblies, and more particularly to a tape drive that includes a plurality of perpendicularly oriented tape guide assemblies that guide the tape between a tape cartridge and a take-up reel past a transducing head.

BACKGROUND OF THE INVENTION

Magnetic medium is used for storage of data generated by computers. Typically, a magnetic storage medium is presented to a magnetic head that writes and reads data on the medium. Magnetic storage disks, commonly referred to as hard disks, are presently the preferred storage medium for use in computer systems when rapid access and substantial storage capacity are required. However, because of their relatively low cost, portability, compactness and storage capacity, magnetic tapes are also used for data storage.

An advantage that tapes have over hard disks is that once the data is on a magnetic tape, the tape and its container (commonly referred to as a cartridge) can be removed from the computer tape drive and stored in a secure location or used for carrying or mailing data to a remote location. This removable and transportable feature allows tapes and tape drives to be used as archival storage and/or "back-up" systems for hard disks. However, as a back-up system, the read and write data error rate must be quite low in order to allow the tape to be used as a useful archival and/or back-up storage device.

The storage density for a given cartridge is increased by writing the data onto the tape in smaller areas and onto a plurality of parallel tracks. As the number of tracks increases, each track becomes narrower and the tape must be constrained to travel on a repeatable plane relative to the read-write head. Insuring that the tape repeatedly travels in the desired plane helps to reduce data retrieval errors.

Prior art techniques for achieving the desired perpendicularity include requiring very tight manufacturing tolerances on the various tape guides components, such as tape guide assembly components. In addition, components within the desired tolerances are often switched in and out during the manufacturing process to find the set of components that together offer the best tape perpendicularity. This process is obviously time consuming and expensive.

Therefore, there is a need for a tape drive having a plurality of tape guide assemblies each oriented in a desired perpendicular plane, and a method of quickly and easily positioning the tape guide assemblies within the tape drive such that each of the plurality of tape guides are positioned in the desired perpendicular position.

SUMMARY OF THE INVENTION

An object of the present invention is to provide a tape drive having a plurality of perpendicularity adjusted tape guide assemblies.

Another object of the present invention is to provide a method of positioning a plurality of tape guides within a tape drive housing such that each of the plurality of tape guides are positioned in the desired perpendicular position.

Briefly, according to the present invention, a magnetic tape drive includes a plurality of tape guide assemblies, wherein each of the plurality of tape guides is adjusted such that magnetic recording tape passes along tape travel surfaces of each of the plurality of tape guides in a desired perpendicular plane. Each of the plurality of tape guides includes a shaft which is mounted to a head guide assembly (HGA), and a tape travel surface which co-axially rotates about the shaft as the magnetic recording tape passes along the tape travel surface. To orient the tape travel surface in a desired perpendicular plane, a perpendicularity adjustment component is secured to a stub portion of the shaft and to the HGA to insure that the tape travel surface remains in the desired orientation.

To mate the tape guide assembly and the HGA, the shaft of the assembly is inserted through a bottom shaft aperture in the HGA and passed co-axially through its associated tape travel assembly, up through a spring which preloads the tape guide assembly, and then through a top shaft aperture of the HGA. The stub portion of the shaft rises slightly above a top flange surface of the HGA through which the top shaft aperture is formed. The size of the top shaft aperture is selected to provide enough play for the shaft to be pivoted in order for the tape travel surface to be positioned (automatically or manually) in the desired perpendicular plane during manufacturing prior to securing the perpendicularity component to the head guide assembly. That is, the aperture is preferably of minimum diameter to meet the condition that in all possible combinations ("stack-up") of subcomponent tolerances, the tape guide assembly can be adjusted to the desired perpendicular plane and the top of the shaft is not in contact with the HGA. This ensures that there is enough room to make the orientation adjustments of the present invention.

The perpendicularity adjustment component is preferably a washer that fits over the stub portion of the shaft, such that the stub passes through an inner passage of the washer. The diameter of the inner passage is sized to provide less than about one milliinch of play between the stub portion and the inner passage. During manufacturing the shaft is shifted about a fixed pivot point to position the tape travel surface in the desired perpendicular plane. A bonding agent is then applied to securely mate the perpendicularity adjustment component to the flange of the HGA. This insures of the shaft remains in the fixed position such that the tape travel surface is in the desired perpendicular plane.

Advantageously, this technique substantially improves the manufacturability of the tape drive and provides a tape drive with improved tape tracking performance.

These and other objects, features and advantages, of the present invention will become more apparent in light of the following detailed description of preferred embodiments thereof, as illustrated in the accompanied drawings.

DETAILED DESCRIPTION OF THE INVENTION

Figure 1:
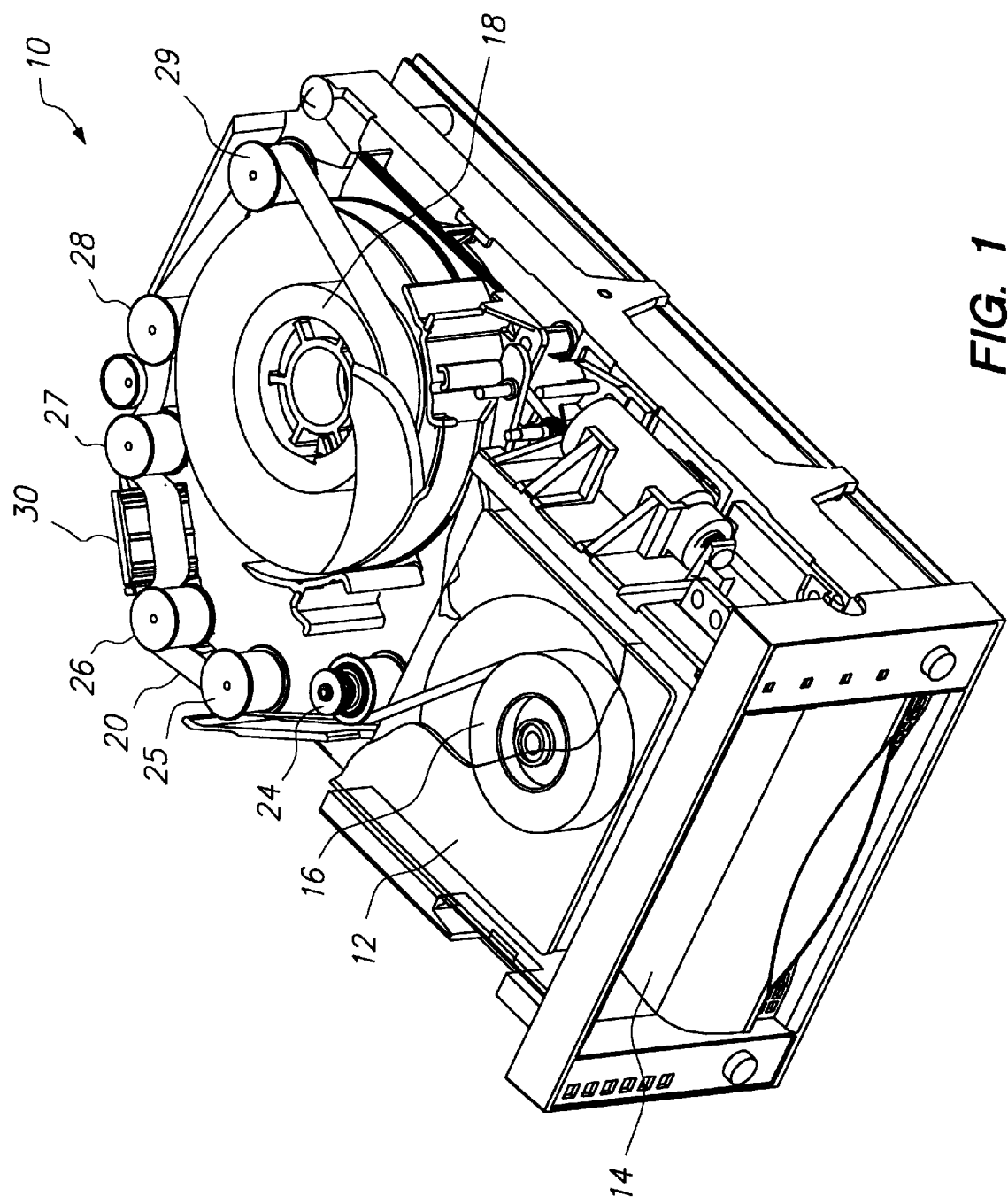
FIG. 1 is a cut-a-way view of a magnetic tape drive.

FIG. 1 illustrates a cut-a-way view of a magnetic tape drive 10 which includes a tape cartridge 12 inserted into a receiver 14. The tape drive 10 includes a motor (not shown) which drives a cartridge supply reel 16. The drive 10 also includes a second motor (not shown) which drives a take-up reel 18. Proper balance of the opposing forces of the two motors produces the required tension on a magnetic tape 20 and also produces tape motion either in or out of the cartridge 12. Hence, the tape 20 may be driven in either a forward direction or a reverse direction to write data onto or read data from the tape as controlled by a motor controller circuit (not shown). The tape 20 is guided by a plurality of tape guide assemblies 24–29 between the take-up reel 18 and the cartridge 12 and past a transducing head 30. An example of an exemplary tape drive is the DLT 7000 tape drive available from the assignee of the present invention.

Figure 2:
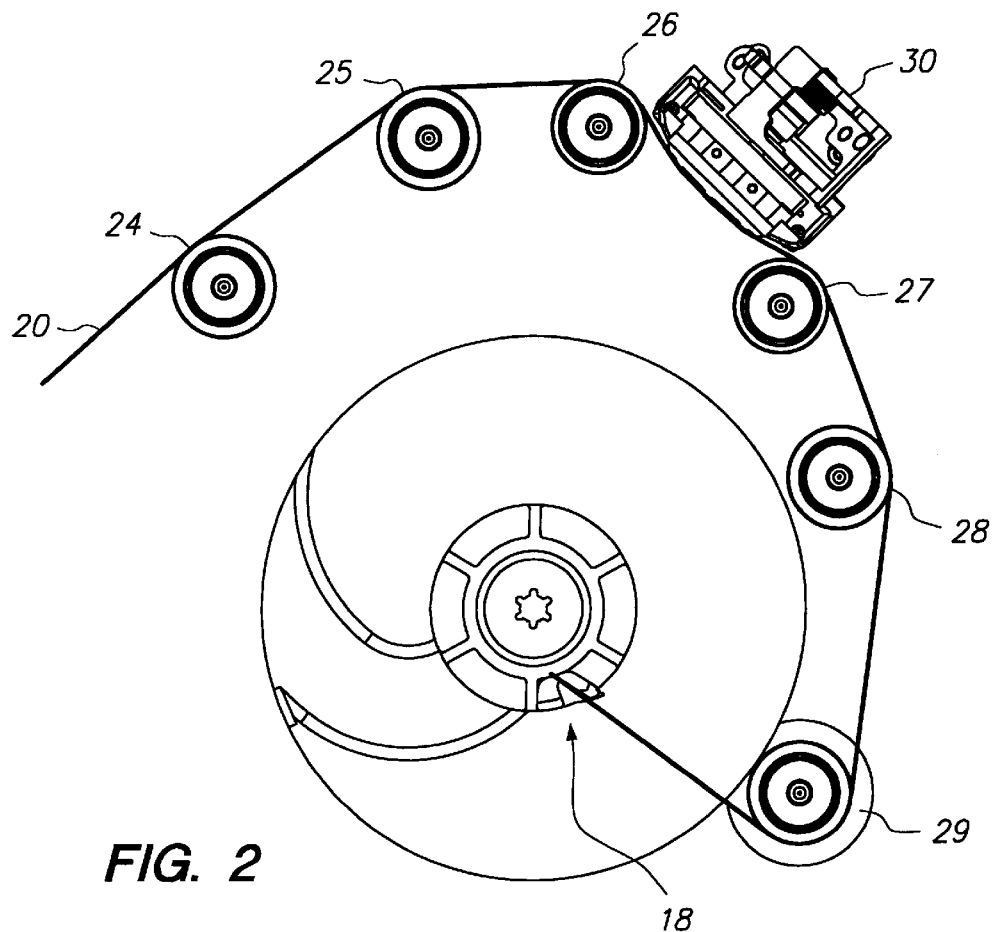
FIG. 2 is a top view of a portion of the tape drive illustrated in FIG. 1.

FIG. 2 is a top view of a portion of the tape drive 10 illustrated in FIG. 1. As shown, the plurality of tape guide assemblies 24–29 are arranged to provide a gentle curved travel path for the tape 20.

Figure 3:
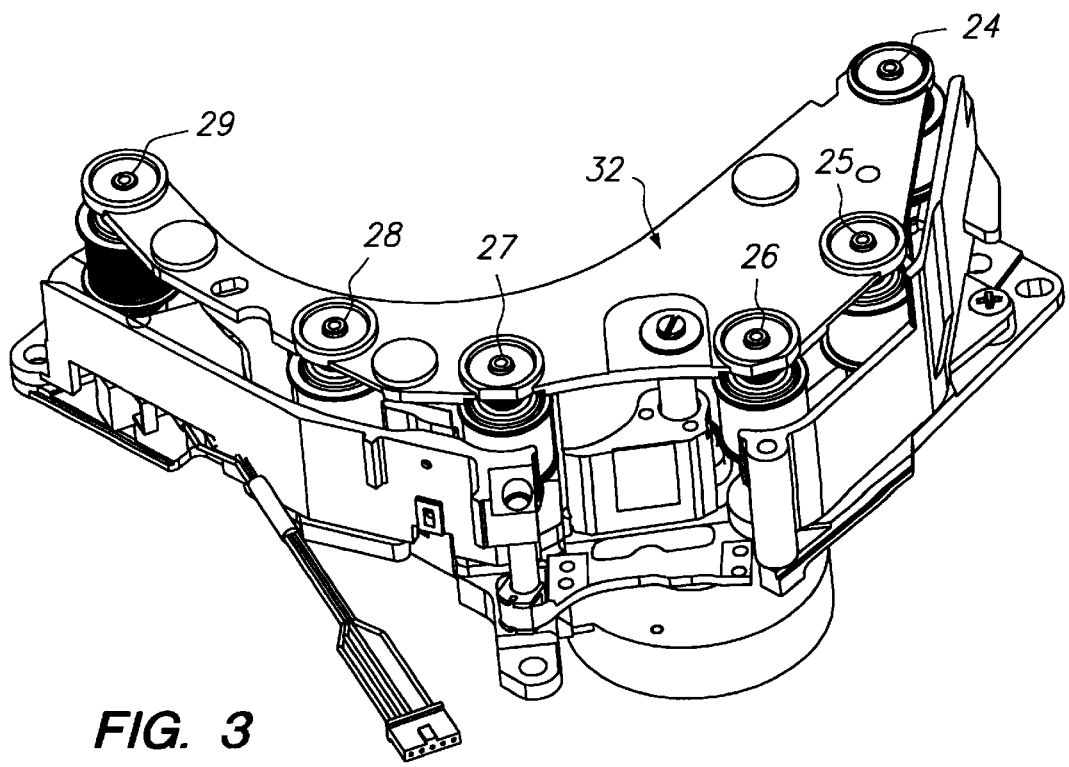
FIG. 3 illustrates a plurality of tape guide assemblies mounted within a head guide assembly (HGA)

Referring to FIG. 3, the plurality of tape guide assemblies 24–29 are mounted within a head guide assembly (HGA) 32. The HGA 32 is a boomerang-shaped aluminum plate that provides a solid platform which retains the plurality of tape guide assemblies 24–29 in their desired orientation to ensure the tape 20 travels along a repeatable path past the head 30 to achieve precise head/tape alignment. The details regarding the orientation of the plurality of tape guide assemblies 24–29 shall now be discussed.

Figure 4:
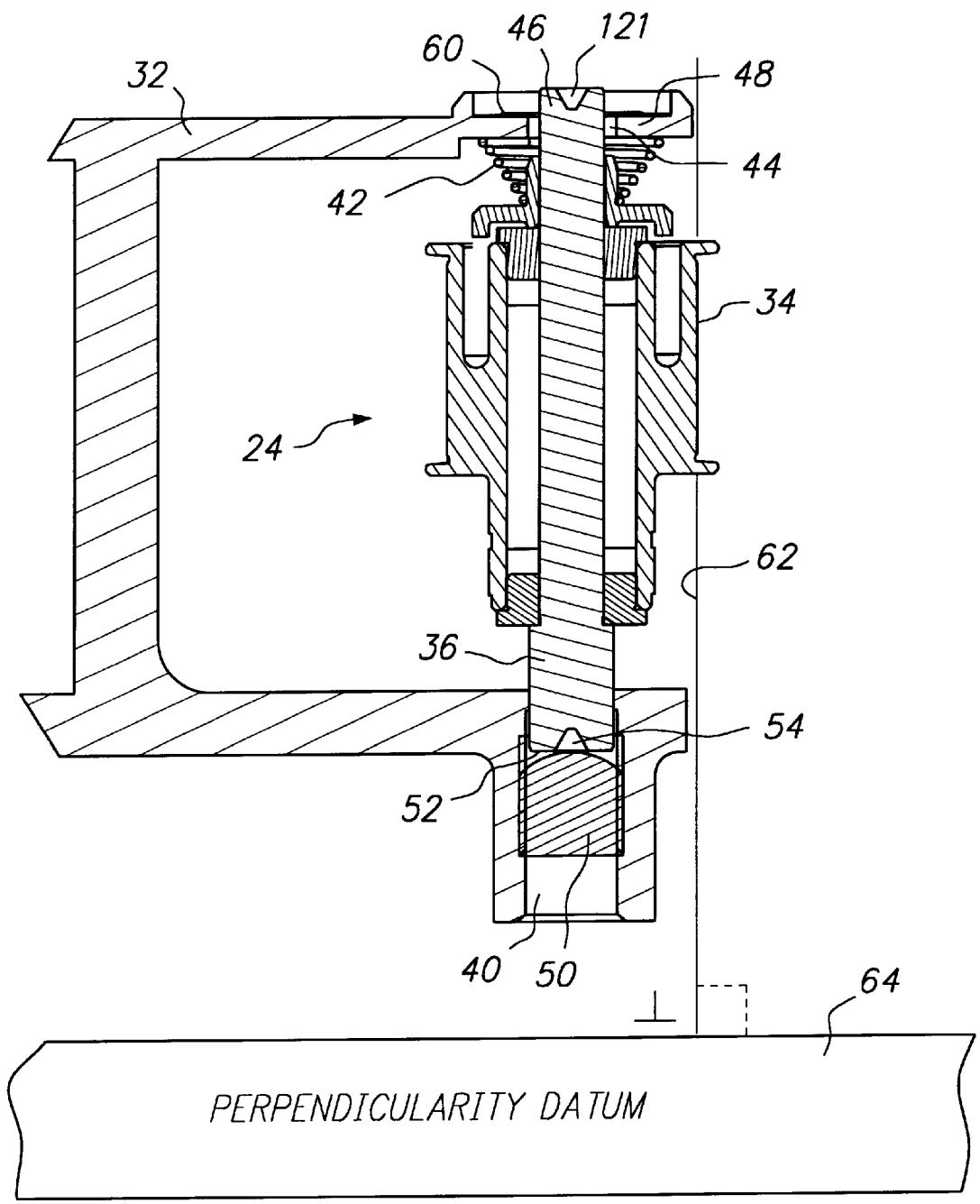
FIG. 4 is a cross-sectional view of a tape guide assembly mounted to the HGA.

FIG. 4 is a cross-sectional view of the tape guide assembly 24 operatively mounted to a portion of a HGA 32. The assembly 24 includes a cylindrical tape travel surface 34 that rotates about an associated cylindrical shaft 36. To assemble the tape guide assembly 24 to the HGA 32, the shaft 36 is inserted through a bottom shaft aperture 40 formed in the HGA. The shaft 36 is passed co-axially through the tape guide assembly 24, a spring 42 and a top shaft aperture 44 formed in a top flange 48 of the HGA 32. A stub portion 46 of the shaft 36 rises slightly above the top flange 48. A crowned plug 50 is inserted into the bottom shaft aperture 40 to set the height of the assembly 24 within the HGA.

The shaft 36 includes a bottom surface 52 having a co-axial indent 54 which eliminates any minute protrusion from the end of the shaft which may compromise the integrity of the height adjustment of the tape guide assembly. The diameter of the top shaft aperture 44 is selected to provide some radial play for the stub portion 46 of the shaft 36, while the diameter of the bottom shaft aperture 40 is sized to allow the stub portion 46 to be radially positioned within the top shaft aperture 44. That is, the shaft can be pivoted within the aperture about the bottom surface 52. Significantly, this allows radial motion of the stub portion 46 within the top shaft aperture 44.

Once the assembly 24 is positioned such that the travel surface 34 is in a desired perpendicular plane, a perpendicularity adjustment component 60 is secured to the top flange 48 to prevent radial motion of the stub portion 46 with respect to the HGA 32. The perpendicularity adjustment component 60 is preferably a washer that fits over the cylindrical stub portion 46 of the shaft, such that the stub 46 passes through an inner passage of the washer.

The diameter of the inner passage is sized to provide less than about one milliinch of play between the stub portion and the inner passage. According to the present invention the stub portion 46 is positioned within the top shaft aperture 44, such that, the tape travel surface 34 is located in a plane 62. The plane 62 is perpendicular to a perpendicularity datum 64 (e.g., a planar granite base).

Figure 5:
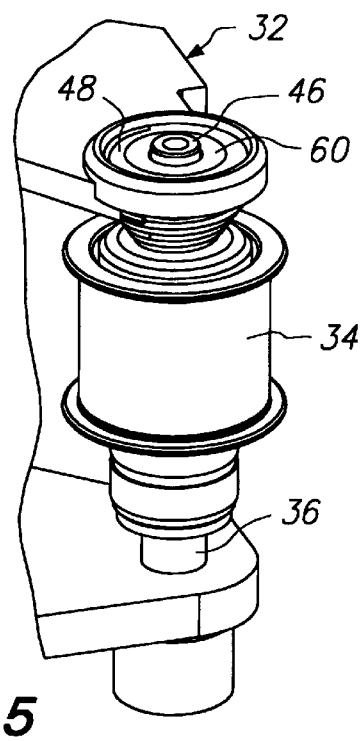
FIG. 5 is a perspective cut-a-way view of the tape guide assembly mounted within the HGA.

FIG. 5 is a perspective cut-a-way view of the tape guide assembly 24 mounted within the HGA 32. The details regarding the positioning of the stub portion 46 of the shaft within the top aperture 44 and securing the perpendicularity adjustment component 60 to the flange 48 shall now be discussed in further detail below.

Figure 6:
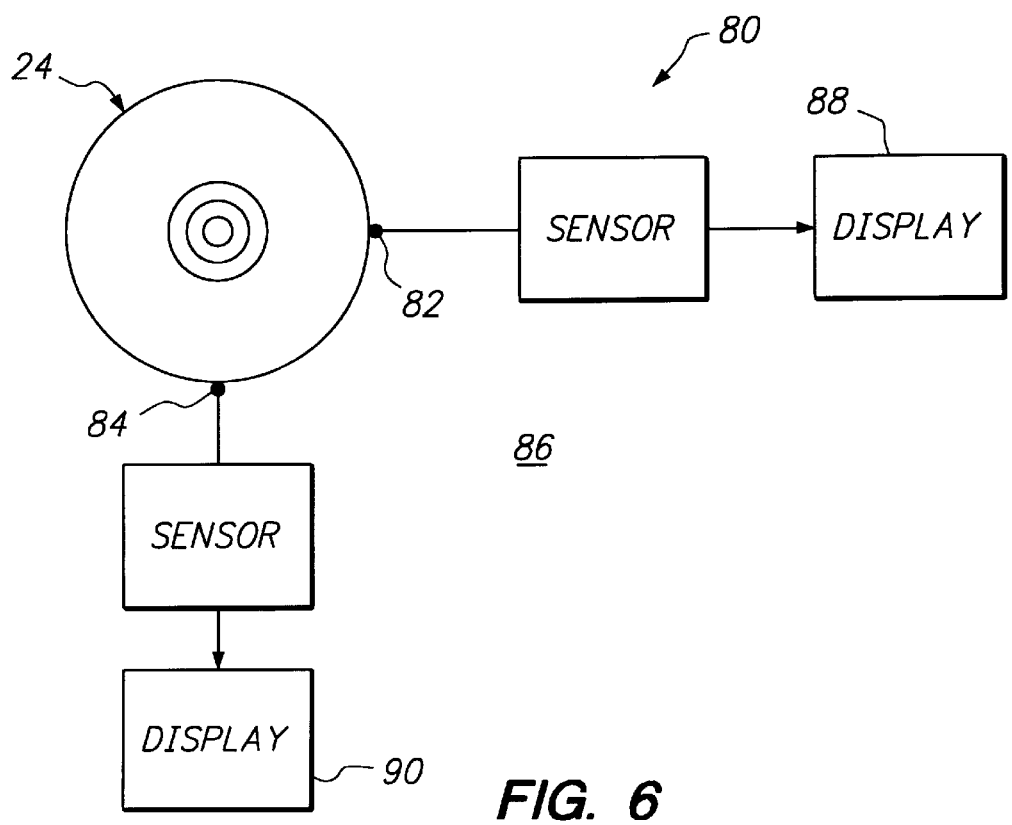
FIG. 6 is a simplified top view of the tape guide assembly positioned for perpendicularity adjustment.

FIG. 6 is a simplified top view 80 of the tape guide assembly 24 positioned for perpendicularity adjustment. Attention is drawn to the fact that during positioning of the assembly, the HGA 32 (including the assemblies 24–29) is held within a fixture, and sensor heads 82, 84 are positioned at right angles to each another against the tape travel surface 34 of the assembly. The assembly is positioned such that the quadrant of the tape travel surface which guides the tape 20 is located in the quadrant 86 formed between the sensor heads 82, 84. To orient the assembly in the desired perpendicular plane 62, each sensor head 82, 84 is carefully positioned such that its tip contacts the tape travel surface 34. When the sensor heads contact the tape travel surface 34, displays 88, 90 provide an indication of the perpendicularity of the tape travel surface 34 in two-dimensions.

Figure 7:
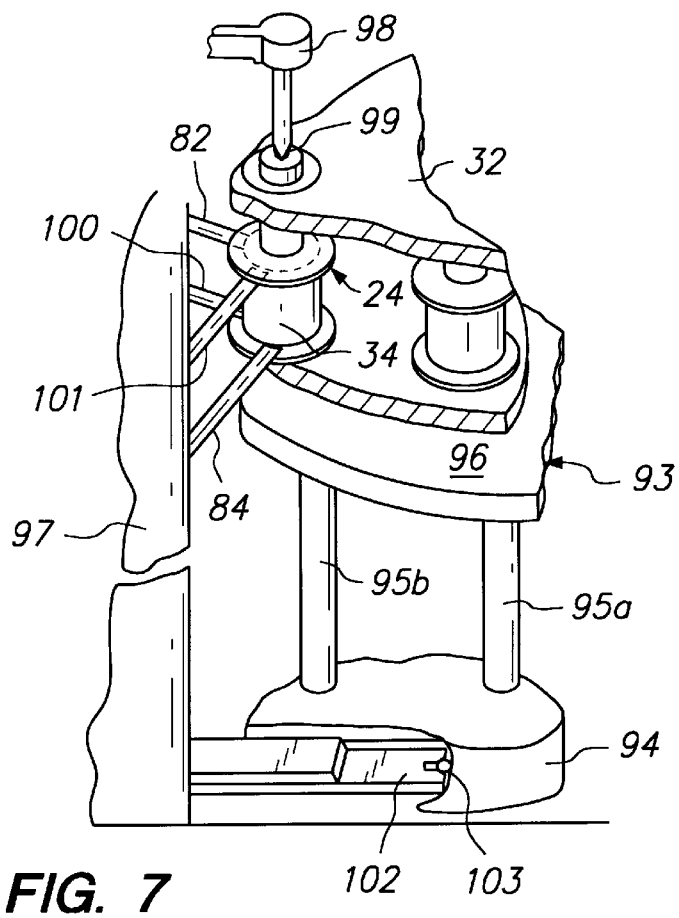
FIG. 7 is a simplified perspective view of the tape guide assembly positioned for adjustment.

FIG. 7 is a simplified perspective view of the tape guide assembly 24 positioned for perpendicularity adjustment. A positioning fixture 93 includes a base 94 and a plurality of supports 95a, 95b that support a surface 96 to which the HGA 32 comprising the tape guide assembly 24 is affixed for positioning. A sensing fixture 97 is positioned adjacent to the positioning fixture 93, and the sensing fixture 97 includes the sensing heads 82, 84 and a precision positioning device 98 that includes a tipped end 99, which is placed into a recess in the stubbed portion of the shaft. The heads 82, 84 are positioned to measure the perpendicularity of the tape travel surface 34. In a preferred embodiment, the head 82 is positioned against the upper portion of the tape travel surface 34, while the head 84 is positioned against the lower portion of the tape travel surface. The sensing fixture 94 also includes reference/calibration heads 100, 101 which are also positioned against the tape travel surface 34, and gripper fingers 102 which engages a stop 103 associated with a known reference point on the base of the positioning fixture 93. The heads 96, 97 provide a repeatable reference for the sensing heads. Adjusting the tape travel assembly shall now be discussed.

Figure 8:
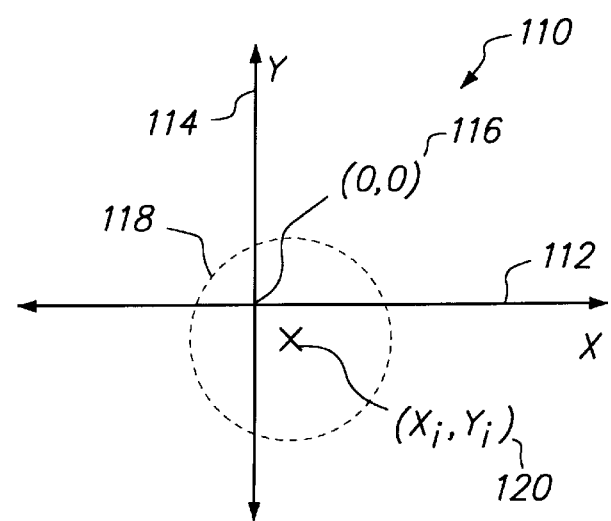
FIG. 8 is a plot indicative of an initial position of a tape guide assembly and a desired position of the tape guide assembly.

FIG. 8 illustrates a plot 110 having a first axis 112 (e.g., illustrated as the x-axis) indicative of the reading from the first sensor head 82, while a second axis 114 (illustrated as the y-axis) is indicative of the reading from the second sensor head 84. Prior to positioning the heads 82, 84 against the tape travel surface 34, each sensor is "zeroed" against a hard steel gage master perpendicularity standard such that the (0,0) position 116 in the (x,y) axes represents the desired perpendicular positioning of the tape travel surface 34 (FIG. 4) with respect to the plane 62 (FIG. 4). When the sensing heads 82, 84 first contact the tape travel surface 34, a measure of the perpendicularity of the tape travel surface 34 can be graphically represented by broken line 118 centered about some initial position $(x_i, y_i)$ 120. The stub portion 46 (FIG. 4) of the shaft 36 is then moved along the x-axis 112 until the sensor head 82 indicates that the tape guide surface is perpendicularly positioned in this axis (i.e., position (0, $y_i$)). Referring to FIG. 4, the top surface of the stub portion 46 includes a co-axial indent 121 into which the precision positioning device is inserted to perform the positioning.

The sensing heads 82, 84 are positioned at a 90 degree angle and moving the stub portion 46 only along these axes allows the assembly 24 to be adjusted in two movements since the adjustments are decoupled from each other. Next, the stub portion 46 is moved along the y-axis 104 using the positioning device until sensor 84 (FIGS. 6 and 7) indicates that the tape guide surface 34 (FIG. 4) is perpendicularly positioned in the y-axis (i.e., now at position (0,0)). At this point the assembly 24 is in the desired perpendicular orientation. The next step is to lock the assembly 24 in this perpendicular position by securing the perpendicularity adjustment component 60 to the flange 48.

Referring again to FIGS. 4 and 5, a bonding agent (preferably Loctite 380 or the like) is applied with a syringe to the surface of the flange 48 at several locations (e.g., one drop in each quadrant) around the circumference of the perpendicularity adjustment component 60. The bonding agent "locks" the perpendicularity adjustment component 60 to the flange 48. Since there is a tight tolerance between the diameter of the cylindrical stub portion 46 and the perpendicularity adjustment component, the stub portion is effectively locked in the desired (0,0) position, thus ensuring that the plane formed by the tape travel surface 34 remains perpendicular to the perpendicularity datum 64. The bonding agent may be dissolved with an Acetone dissolver if it is necessary to reapply the bonding agent.

The process of measuring and securing is preferably repeated for each of the assemblies 24–29 in the tape drive 10. However, it is contemplated that only the assemblies (i.e., 26, 27) adjacent to the head 30 (FIG. 1) may need to be adjusted according to the present invention.

A plastic cover plate (not shown) may be placed over the perpendicularity adjustment component to spread the bonding agent and prevent outgassing of the agent.

One of ordinary skill will recognize that the present invention is not limited to use of a washer as the perpendicularity adjustment component. Once the assembly is in the desired position, it may be secured in that position via a number of techniques including threaded fasteners, rivets, solder, welds, etc. In addition, although the present invention has been discussed in the context of positioning the tape travel surface in a plane perpendicular to the perpendicularity datum 64, one of ordinary skill will recognize that the adjustment technique of the present invention may also be used to position the tape travel surfaces in various positions.

Although the present invention has been shown and described with respect to several preferred embodiments thereof, various changes, omissions and additions to the form and detail thereof, may be made there in, without departing from the spirit and scope of the invention.

What is claimed is:

1. A magnetic tape drive which receives a tape cartridge, the tape drive comprising:

a receiver into which the tape cartridge is operatively engaged;

a take-up reel;

a transducing head;

a plurality of tape guide assemblies which guide the tape between said receiver and said take-up reel past said transducing head, wherein each of said plurality of tape guide assemblies is mounted to a head guide assembly (HGA) and each tape guide assembly includes (i) a tape guide surface which rotates about an associated shaft and having a top stub portion which extends above a flange of said HGA;

(ii) means for preventing radial motion of said stub portion with respect to said flange, the means for preventing including an adjustment component which securely fits over said stub portion, the adjustment component having an inner passage through which said stub portion passes, the inner passage having substantially the same cross sectional shape as said stub portion, and the adjustment component being sized to slip over said stub portion with relatively little play, wherein the inner passage is sized to provide less than about one milliinch of play between said stub portion and said inner passage; and wherein each of said means for preventing is mounted to ensure that the tape travels along each of said tape guide surfaces in a repeatable plane.

2. The tape drive of claim 1, wherein said means for preventing comprises:

a bonding agent that secures said adjustment component to said flange to prevent radial motion of said stub portion.

3. The tape drive of claim 1, wherein said HGA is a rigid boomerang shaped structure and said tape drive comprises at least two tape guide assemblies.

4. The tape drive of claim 1, wherein said inner passage is circular, and said stub portion is cylindrical and has a circular cross section.

5. The tape drive of claim 1, wherein said HGA includes a plurality of bottom shaft apertures each uniquely associated with one said plurality of tape guide assemblies, wherein said shaft of said associated tape guide assembly passes through said bottom shaft aperture, co-axially through said tape guide assembly and a top shaft aperture formed in said flange, and through said inner passage.

6. A method of positioning a tape guide assembly within a tape head guide assembly (HGA), comprising the steps of:

inserting a first end of a tape guide assembly shaft through a first aperture formed in the HGA;

inserting a second end of the tape guide assembly shaft through a second aperture formed in a flange of the HGA, the second end of the shaft being pivotal about the first end of the shaft relative to the flange and the second aperture;

pivoting the second end of the tape guide assembly shaft within the second aperture to establish orthogonal perpendicularity between the tape guide assembly and a datum plane and securing the second end of the tape guide assembly shaft to the flange near the second aperture so that the second end does not pivot relative to the second aperture.

7. A tape drive which receives a tape cartridge, the tape drive comprising:

a receiver into which the tape cartridge is operatively engaged;

a take-up reel;

a transducing head;

a plurality of tape guide assemblies which guide the tape between said receiver and said take-up reel past said transducing head, wherein each of said plurality of tape guide assemblies is operatively mounted to a head guide assembly (HGA) and each tape guide assembly includes (i) a cylindrical tape guide surface which rotates about an associated shaft and having a top stub portion which extends above a flange of said HGA;

(ii) a fastener that prevents radial motion of said stub portion with respect to said flange, the fastener including a washer having an inner passage through which said stub portion passes and a bonding agent which secures said washer to said flange to prevent radial motion of said stub portion; said inner passage has substantially the same cross sectional shape as said stub portion and is sized to slip over said stub portion with relatively little play; wherein the inner passage is sized to provide less than about one milliinch of play between said stub portion and said inner passage; and wherein each of fasteners is affixed to said flange to ensure that the tape travels along each of said cylindrical tape drive surfaces in a repeatable plane.

8. The tape drive of claim 7, wherein said HGA includes a plurality of bottom shaft apertures each uniquely associated with one said plurality of tape guide assemblies, wherein said shaft of said associated tape guide assembly passes through said bottom shaft aperture, co-axially through said tape guide assembly and a top shaft aperture formed in said flange, and is held in position by said fastener.

9. The tape drive of claim 7, wherein said inner passage is circular, and said stub portion is cylindrical and has a circular cross section.

10. A method of positioning a tape guide assembly having a cylindrical tape travel surface within a head guide assembly (HGA), comprising the steps of:

providing a first measurement indicative of the position of the tape travel surface in a first reference plane;

providing a second measurement indicative of the position of the tape travel surface in a second reference plane as sensed by first and second sensor heads respectively, wherein the first and second reference planes are orthogonal to each other and both orthogonal to a perpendicularity datum plane;

moving a stub portion of a shaft about which the tape travel assembly rotates, in the first plane to position the stub portion at a null position within the first plane, wherein the stub portion of the shaft extends beyond a tape flange surface of the head guide assembly;

moving the stub portion in the second plane to position the stub portion at a null position along the second plane; and securing a perpendicularity adjustment component to the stub portion and the flange to hold the stub portion in the null positions along the first and second planes.

11. A method of positioning a tape guide assembly within a tape head guide assembly (HGA), comprising the steps of:

inserting a first end of a tape guide assembly shaft through a first aperture formed in the HGA;

inserting a second end of the tape guide assembly shaft through a second aperture formed in a flange of the HGA;

pivoting the second end of the tape guide assembly shaft within the second aperture relative to the first end to establish orthogonal perpendicularity between the tape guide assembly and a datum plane; and placing an adjustment component over the flange so that the second end does not pivot relative to the aperture.

12. The method of claim 11 further comprising the step of securing the HGA within a fixture.

13. A method of positioning a tape guide assembly within a tape head guide assembly (HGA), comprising the steps of:

inserting a first end of a tape guide assembly shaft through a first aperture formed in the HGA;

inserting a second end of the tape guide assembly shaft through a second aperture formed in a flange of the HGA; and establishing orthogonal perpendicularity between the tape guide assembly and a datum plane by (i) measuring a tape travel surface position within a first plane; (ii) measuring the tape travel surface position within a second plane, wherein the first and second planes are orthogonal; (iii) moving the stub portion in the first plane to position the stub portion at a null position within the first plane; (iv) moving the stub portion in the second plane along the second plane to position the stub portion at a null position along the second plane; and (v) securing the perpendicularity adjustment component to the flange to hold the stub portion in the null positions along the first and second planes.

14. The method of claim 13 wherein the step of measuring the tape travel surface position within a first plane further comprises the step of positioning a first contact sensor against the tape travel surface.

15. The method of claim 14 wherein the step of measuring the tape travel surface position within a second plane further comprises the step of positioning a second sensor against the tape travel surface at approximately the same height relative to the first sensor head and at approximately a right angle relative to the position of the first sensor head.

16. The method of claim 13 wherein the step of securing the perpendicularity adjustment component to the flange further comprises the step of applying a bonding agent to the flange around an outer perimeter of the perpendicularity adjustment component.

17. A tape drive which receives a tape cartridge, the tape drive comprising:

a receiver that receives the tape cartridge;

a take-up reel;

a tape guide assembly which guides the tape between the receiver and the take-up reel, the guide assembly including a shaft having a first end and a second end;

a head guide assembly including a first flange and a second flange, the second flange including an aperture for receiving a portion of the shaft, the first flange retaining the first end of the shaft and allowing the shaft to pivot relative to the first flange and aperture in the second flange to establish orthogonal perpendicularity between the tape guide assembly and a datum plane; and an adjustment component that secures the shaft to the second flange and inhibits the shaft from pivoting relative to the first flange.

18. The tape drive of claim 17 wherein the tape guide assembly includes a tape guide surface that rotates about the shaft.

19. The tape drive of claim 17 wherein the shaft includes a top stub portion that extends through the aperture in the second flange and above the second flange.

20. The tape drive of claim 19 wherein the adjustment component fits securely over the top stub portion and is positioned above the second flange.

21. The tape drive of claim 20 wherein the adjustment component includes an inner passage through which the stub portion passes, the inner passage having substantially the same cross sectional shape and size as the stub portion.

22. The tape drive of claim 21 wherein the inner passage is sized to provide less than about one milliinch of play between the stub portion and the inner passage.

23. The tape drive of claim 20 including a bonding agent that secures the adjustment component to the second flange.

* * * * *